(No Model.)   2 Sheets—Sheet 1.

G. L. THOMPSON.
KIT FOR HEATING CURLING IRONS, &c.

No. 511,976.   Patented Jan. 2, 1894.

Witnesses:   Inventor.
  George L. Thompson.
  By Dayton, Poole & Brown
   Attys.

(No Model.)
G. L. THOMPSON.
KIT FOR HEATING CURLING IRONS, &c.
No. 511,976. Patented Jan. 2, 1894.
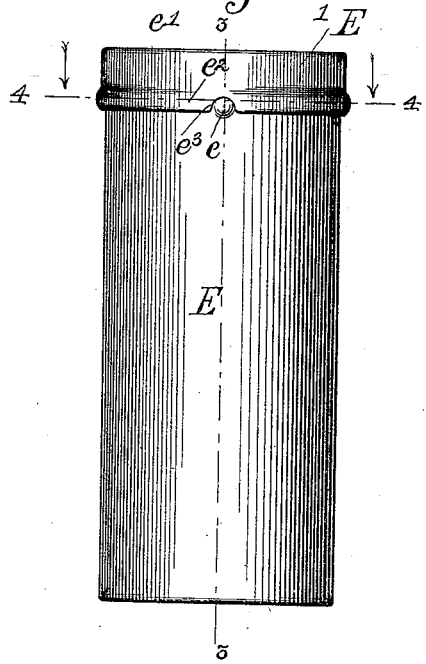
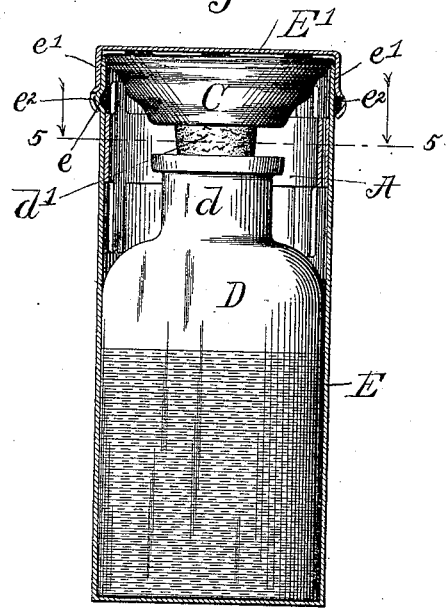
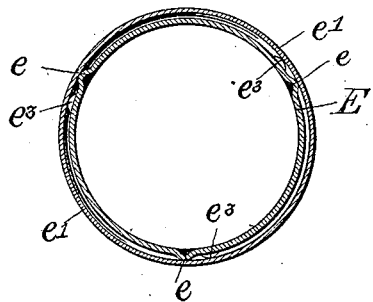
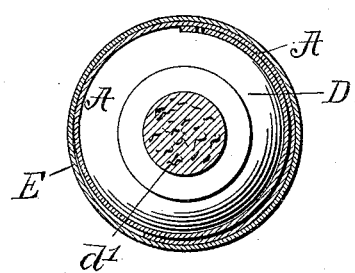
Witnesses:
W. Graham
Jno. L. Condron
Inventor
George L. Thompson.
By Daytree, Poole & Brown.
Attys.

UNITED STATES PATENT OFFICE.

GEORGE L. THOMPSON, OF CHICAGO, ILLINOIS.

KIT FOR HEATING CURLING-IRONS, &c.

SPECIFICATION forming part of Letters Patent No. 511,976, dated January 2, 1894.

Application filed August 31, 1893. Serial No. 484,491. (No model.)

*To all whom it may concern:*

Be it known that I, GEORGE L. THOMPSON, of Chicago, in the county of Cook and State of Illinois, have invented certain new and useful Improvements in Kits for Heating Curling-Irons, &c.; and I do hereby declare that the following is a full, clear, and exact description thereof, reference being had to the accompanying drawings, and to the letters of reference marked thereon, which form a part of this specification.

My invention relates to portable appliances for heating curling-irons, and for similar purposes, and the objects of my invention are to produce appliances which shall be simple and durable in construction and adapted to materially facilitate the operation of heating curling-irons, &c., and which shall also be capable of compact assemblage in a receptacle, so as to occupy the minimum of space and so also as to prevent all possibility of leakage of the alcohol, or other liquid fuel, when the appliances are packed within the receptacle.

To the above purposes, my invention consists in certain peculiar and novel features of construction and arrangement, as hereinafter described and claimed.

The more precise nature of my invention will be better understood when described with reference to the accompanying drawings, in which—

Figure 1:
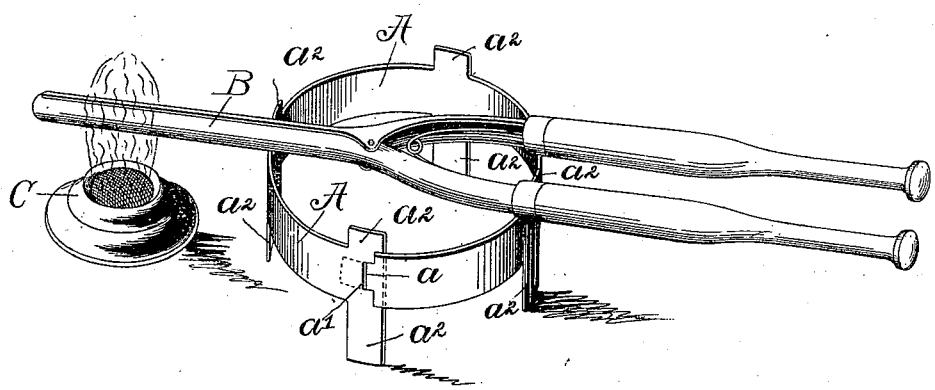
Figure 6:
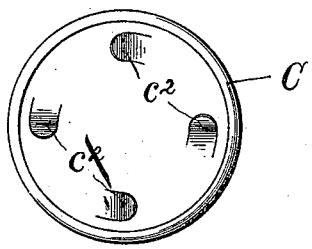
Figure 7:
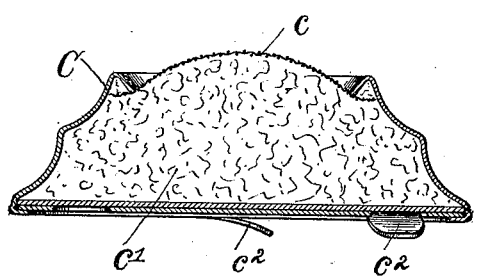

Figure 1 is a perspective view of a support for a curling-iron, and an alcohol lamp embodying my invention and arranged in proper relation to a curling-iron, for heating the latter. Fig. 2 is a side elevation of the receptacle for the several appliances. Fig. 3 is a transverse vertical section, taken on the line 3—3 of Fig. 2 and showing the appliances packed within the receptacle. Fig. 4 is a horizontal section, taken on the line 4—4 of Fig. 2; the direction of view being downward, as indicated by the arrows applied to the section-line. Fig. 5 is a horizontal section, taken on the line 5—5 of Fig. 3; the direction of view being downward as indicated by the arrow applied to the section-line. Fig. 6 is an inverted plan view of the alcohol lamp, showing its spring-tongues. Fig. 7 is an enlarged view, in central transverse vertical section, of the alcohol lamp.

In the said drawings, A designates the support for a curling-iron, or a cup, or other device which is to be heated or to have its contents heated. This support A is a thin strip of steel or other metal, suitably tempered and of proper length, and also bent normally into circular form. At one end, the strip is formed or provided, in any desired manner, with a longitudinally extending tongue $a$ which separably enters a slot or slit $a'$ formed transversely in the opposite end of the strip. When the support is not in use, the two ends of the strip are disconnected (as hereinafter more fully explained), but when the support is in use, the tongue $a$ is inserted into the slit $a'$ and possesses sufficient frictional contact therewith to retain the circular form of the support. From the opposite margins of the strip A, extend lugs or projections $a^2$, the lugs on one margin being either precisely opposite the lugs on the other margin or otherwise, as preferred. When the support is in use, it stands upon one set of lugs $a^2$ and the other set of lugs serve either to retain a curling-iron B upon the support, or to sustain a cup or pail or other receptacle for liquid.

The curling-iron B may be either of the kind shown or of any other suitable or preferred type, and, while being heated, the iron is laid upon the support A, as shown in Fig. 1; the end of the iron projecting over the alcohol lamp C so as to enter the flame therefrom, and the lamp being placed at one side of the support as is also shown in said figure.

When water or other liquid is to be heated, the lamp C is placed centrally within the holder A, so that the holder shall surround the lamp, and support the cup or pail or other receptacle containing the liquid. The receptacle rests upon the upper lugs $a^2$ and spaces are thus left by said upper lugs for permitting the flame from the lamp to envelop the bottom of the receptacle.

When not in use the holder A, lamp C and a bottle D, for containing the alcohol for the lamp C are packed into a receptacle or case E, as shown in Fig. 3. The receptacle is of cylindrical form, and is preferably of sheet-metal; the upper end of the receptacle being provided with a removable top or cover E'. At intervals, the upper end of the receptacle E is formed with outwardly projecting knobs $e$ preferably formed by punching the metal outward, but also permissibly formed in any suitable manner. The marginal flange $e'$ of the cap E is formed with a continuous groove or bead $e^2$ and at intervals with recesses or notches $e^3$ opening from the lower edge of the flange $e'$ and into the groove $e^2$. When the cover E' is to be applied to the receptacle E, the notches $e^3$ are registered with the studs $e$ and the latter are caused to enter the recesses by forcing the cover downward upon the end of the receptacle E. The cover is then turned partially, so as to cause the studs $e$ to leave the notches $e^3$ and enter the groove $e^2$, and it will thus be seen that the cover can not then be forced directly off of the end of the receptacle; it being necessary in order to remove the cover, to turn it until the notches $e^3$ again register with the studs $e$ after which the cover can be pulled directly off of the receptacle E.

The lamp C is of the usual type of "pocket" alcohol lamps, so far as its general construction is concerned. That is to say it has a disk-shaped bottom and concavo-convex sides, with a burner-opening in its top which contains a wire screen $c$; the interior of the lamp being filled with a mass $c'$ of asbestus fiber or equivalent non-combustible absorbent to hold the alcohol. The lamp differs, however, from the ordinary "pocket" lamp in having its bottom provided with spring tongues $c^2$ which project obliquely outward from the bottom, for a purpose to be presently explained.

The bottle D, which contains the alcohol with which the lamp C is supplied, is preferably of an external diameter nearly equal to the internal diameter of the receptacle E. The bottle is, however, of less length than the receptacle and has a neck $d$ into the mouth of which a cork or stopper $d'$ is inserted.

When the various appliances are not in use, they are to be compactly placed in the receptacle E in the following manner: The bottle D is first placed in the receptacle with its cork presented toward the open end of the receptacle. The tongue $a$ of the holder A is pulled out of the slit $a'$ thereof and said holder is wound spirally so as to form a ring smaller than the receptacle, and is placed in the latter, adjacent to the neck $d$ of the bottle. The lamp C is placed in inverted condition into the open end of the receptacle so as to rest directly upon the stopper $d'$ of the bottle. The cover E' is now placed in position upon the top of the receptacle E; the spring-tongues $c^2$ of the lamp impinging against the inner surface of the cover, and the cover is turned so as to be locked by its groove $e^2$ engaging the studs $e'$, as above described. The pressure of the spring-tongues against the cover E' is transferred to the cork $d'$ of the bottle, through the body of the lamp C, and consequently the lamp body retains the cork in the mouth of the bottle. The lamp body is in its external diameter about equal to the internal diameter of the receptacle E, and such being also true of the bottle D and the coiled holder A, is retained in its position between the lamp body and the body of the bottle by its outward pressure against the receptacle. Thus there can be no rattling or breakage of the parts within the receptacle E nor any leakage from the bottle D.

I claim as my invention—

1. A kit for the purpose stated, comprising a receptacle having a cover detachably connected with one end of the receptacle, a bottle of less length than the internal length of the receptacle and provided with a stopper, and a lamp or burner having resilient projections upon its bottom to engage the top of the receptacle and to press the burner body against the stopper of the bottle, substantially as set forth.

2. A kit for the purpose stated, comprising a receptacle having a cover detachably connected with one end of the receptacle, a bottle of less length than the internal length of the receptacle and provided with a stopper, a burner having resilient projections upon its bottom to engage the top of the receptacle and to press the burner against the stopper of the bottle, and a flexible holder bent into coiled form and located within the receptacle between the body portion thereof and the burner, substantially as set forth.

3. A support for heating curling irons and the like, consisting of a flexible strip of metal having detachable interlocking parts at its ends whereby the strip may be retained in circular form for use or coiled for packing, substantially as set forth.

4. A kit for the purpose stated, comprising a lamp or burner, a support consisting of a flexible strip of metal having interlocking projections at its ends, and a cylindric receptacle adapted to receive the lamp and the support when in coiled form, substantially as described.

5. A support for heating curling irons and the like, consisting of a flexible strip of metal having detachable interlocking parts at its ends, and lugs or projections at its opposite sides, substantially as described.

6. A kit for heating curling irons &c., comprising a bottle, a lamp or burner having resilient projections on its bottom and a receptacle having a plurality of projections near its open end, and provided with a detachable cover having a groove in its marginal flange, and a plurality of notches communicating with the said groove, the notches and groove being adapted to receive the projections, substantially as set forth.

In testimony that I claim the foregoing as my invention I affix my signature in presence of two witnesses.

GEORGE L. THOMPSON.

Witnesses:
C. CLARENCE POOLE,
TAYLOR E. BROWN.